United States Patent [19]
Janocha et al.

[11] Patent Number: 4,842,187
[45] Date of Patent: Jun. 27, 1989

[54] OPAQUE FILM FOR CANDY TWIST WRAPPING

[75] Inventors: Siegfried Janocha, Wiesbaden; Guenther Crass, Taunusstein; Gunter Schloegl, Kelkheim; Lothar Bothe, Mainz-Gonsenheim, all of Fed. Rep. of Germany

[73] Assignee: Hoechst Aktiengesellschaft, Frankfurt am Main, Fed. Rep. of Germany

[21] Appl. No.: 31,379

[22] Filed: Mar. 30, 1987

[30] Foreign Application Priority Data

Apr. 4, 1986 [DE] Fed. Rep. of Germany ....... 3611341

[51] Int. Cl.⁴ ..................... B65D 11/16; B65D 65/38; B32B 27/08
[52] U.S. Cl. ................................. 229/87 F; 428/35.7; 428/332; 428/349; 428/516; 206/524.1; 206/524.2; 206/800; 428/36.92
[58] Field of Search ................... 428/35, 36, 515, 516, 428/517, 519, 328, 331, 332, 402

[56] References Cited

U.S. PATENT DOCUMENTS

| | | | |
|---|---|---|---|
| 3,666,836 | 5/1972 | John | 525/210 |
| 4,303,708 | 12/1981 | Gebhardt et al. | 428/35 |
| 4,394,235 | 7/1983 | Brandt et al. | 525/210 |
| 4,663,219 | 5/1987 | Janocha et al. | 428/213 |
| 4,666,772 | 5/1987 | Schinkel et al. | 428/515 |

FOREIGN PATENT DOCUMENTS

| | | | |
|---|---|---|---|
| 0197049 | 11/1983 | Japan | 428/517 |
| 0023042 | 2/1985 | Japan | 428/515 |
| 0036128 | 2/1985 | Japan | 428/516 |

Primary Examiner—Ellis P. Robinson
Assistant Examiner—Betsy Bozzelli
Attorney, Agent, or Firm—Foley & Lardner, Schwartz, Jeffery, Schwaab, Mack, Blumenthal & Evans

[57] ABSTRACT

Described is an opaque, biaxially draw-oriented thermoplastic film for candy twist wrapping. The film is formed from a polymer mixture comprising from about 40 to about 60% by weight of polypropylene and from about 35 to about 55% by weight of polystyrene, relative to the total weight of the mixture. The mixture additionally comprises from about 5 to about 15% by weight of a filler material, relative to the total weight of the mixture.

22 Claims, No Drawings

OPAQUE FILM FOR CANDY TWIST WRAPPING

BACKGROUND OF THE INVENTION

The invention relates to an opaque, biaxially draw-oriented film of a thermoplastic for candy twist wrapping.

Twist wrapping is a particular method of closing complete wrappings for packaging goods. This packaging method is particularly known in connection with the complete wrapping of relatively small goods. The goods preferably include, round or approximately round articles such as candies, bottles, candles, rolls of circular candies, chocolate bars, marzipan bars or the like. Goods of this type are frequently packaged in this manner.

As a prerequisite for the use of a twist wrapping, the film must exhibit the properties of neither tear-starting nor tearing-off at the twist points, but also must be sufficiently stiff so that no shrinkage or crumpling occurs during twisting. According to the state of the art, cellophane film, i.e., regenerated cellulose, non-oriented polypropylene or PVC is predominantly employed for candy wrappings. See "Verpacken mit Kunststoffen" ["Packing with Plastics"] by Guenther Kuehne, published 1974, Carl-Hanser-Verlag, Munich, page 63.

SUMMARY OF THE INVENTION is therefore an object of the present invention to provide an opaque film specifically for the twist wrapping of small goods, especially of candies.

It is also an object of the present invention to provide a film of particularly high inherent rigidity for candy twist wrapping, which has an improved twist behavior in the twisted form and which ensures the best possible runability on the machines.

It is a further object of the present invention to provide a film, due to its excellent slip properties, that allows smooth filling of bags with the wrapped candies.

Another object of the present invention is to provide a film that lacks the properties of tear-starting or tearing-off at the twist points, and yet avoids shrinking or crumpling during twisting.

It is another object of the present invention to provide a biaxially draw-oriented film of a thermoplastic polymer mixture.

In accordance with one aspect of the present invention, there has been provided an opaque, biaxially draw-oriented thermoplastic film comprising a polymer mixture comprising: (a) from about 40 to about 60% by weight of polypropylene, (b) from about 35 to about 55% by weight of polystyrene, relative to the total weight of the mixture, and (c) from about 5 to about 15% by weight of a filler material.

In accordance with another aspect of the present invention, these objects have been achieved by a film wherein the density of the film is a value lower than the additive value of the density of each individual component of the film.

There has also been provided in accordance with the present invention an improved article of manufacture comprising an article twist-wrapped with the film according to the invention.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

DETAILED DESCRIPTION OF PREFERRED EMBODIMENTS

Within the scope of the resent invention, the term "twist behavior" is to be understood as denoting the property of the film of showing sufficient stability (rigidity) in the twisted form, i.e. after being twisted at the sides, so that during transportation and storage the contents of the package will not be released from the package by the film untwisting of its own accord. The twist behavior of the film can be expressed numerically by the twist rate. The twist rate is defined as the percentage of remaining twist:

$$\text{Twist rate } (TR) \text{ in percent } \frac{\text{remaining twist}}{\text{windings upon twisting}} \cdot 100$$

The following result is obtained, for example, for an assumed total winding of 1.5 (=540°) in the twisting operation and a restoring angle of 100°:

| | | |
|---|---|---|
| total winding | 1.5 times = | 540° |
| restoring angle | | 100° |
| remaining twist | = | 440° |

$$\frac{440}{540} \cdot 100 = TR = 81.5\%$$

The film of the present invention is formed of a polymer mixture comprising from about 40 to about 60% by weight, preferably from about 45 to about 55% by weight, of polypropylene and from about 35 to about 55% by weight, preferably from about 35 to about 45% by weight, of polystyrene, relative to the total weight of the polymer mixture. Polypropylene preferably is the main constituent of the polymer mixture. The mixture additionally contains from about 5 to about 15% by weight of filler material, relative to the total weight of the mixture.

The film according to the present invention can comprise a single-layer film (monofilm) or a multi-layer film. A monofilm is comprised entirely of the indicated mixture, whereas, in the case of a multi-layer film, the base layer comprises the indicated mixture and is coated with at least one functional covering layer on one or both sides thereof. The base layer preferably has a thickness of more than about 50% of the total thickness of the multi-layer film.

Within the scope of the present invention, the polypropylene preferably employed for the mixture of the monofilm or of the base layer is an isotactic propylene homopolymer or a copolymer which is predominantly composed of propylene units. Such polymers usually have a melting point of not less than about 140° C., and preferably in the range of from about 150° to about 170° C. Isotactic polypropylene having an n-heptance-soluble content of less than about 15% by weight, copolymers of ethylene and propylene having an ethylene content of less than about 10% by weight, and copolymers of propylene with other alpha-olefins of from 4 to 8 carbon atoms and containing less than about 10% by weight of these alphaolefins are typical examples of the preferred thermoplastic polypropylene of the mixture.

The preferred thermoplastic polymers preferably have a melt flow index in the range from about 0.5 g/10 min. to about 8 g/10 min. at 230° C. and 2,16 kg load (DIN 53,735), and particularly from about 1.5 g/10 min. to about 4 g/10 min. In principle, any styrene polymer can be employed as the polystyrene. It is also possible to use copolymers of unsubstituted and substituted styrenes, such as alkyl styrene or alkoxystyrene.

The fillers are inorganic or organic pulverulent materials incompatible with the mixture of polypropylene and polystyrene. Inorganic fillers are preferred. Suitable inorganic fillers include aluminum oxide, aluminum sulfate, barium sulfate, calcium carbonate, magnesium carbonate, silicates such as aluminum silicate (kaolin clay) and magnesium silicate (talc), silicon dioxide and/or titanium dioxide, among which the use of calcium carbonate, silicon dioxide, titanium dioxide, or mixtures thereof, is preferred. Calcium carbonate (chalk) is particularly preferred. Suitable organic fillers include, for example, particles of polymers such as polymethylmethacrylate, polyethylacrylate or polyethylene, of polyamides or of polymers based on polyesters. The amount of filler material, according to the present invention, is from about 5 to about 15% by weight, relative to the weight of the mixtures of polymers plus filler. The mean particle size of the pulverulent filler, according to the present invention, is in the range of from about 2 to about 5 $\mu$m, preferably in the range of from about 3 to about 4 $\mu$m. The mixture employed for the monofilm or the base layer can also contain appropriate additives such as antioxidants, antistatic agents, colorants and/or stabilizers, each in an effective amount.

The film of the aforementioned composition has, in view of its intended use, a very favorable twist rate which is greater than or equal to about 85%, as measured at a total rate of winding in the range of from about 360° to about 900°.

As noted above, the film of the present invention can basically be in the form of a monofilm. A monofilm can be produced according to an extrusion process, in which the thermoplastic material is melted in an extruder, extruded through a die and chilled to give a cast film. The cast film is then draw-oriented in orthogonal directions (longitudinally and transversely) and thereafter heatset. The final film preferably has a thickness in the range of from about 15 to about 30 $\mu$m, particularly preferably from about 20 to about 25 $\mu$m.

In a preferred embodiment, however, the film of the invention comprises a base layer and functional covering layers applied to one or both sides thereof.

The covering layers applied to one or both sides of the base layer comprising the polymer mixture can be heat-sealable or cold-sealable layers. They can also be non-sealable layers. All these layers may be present on one or both sides. A heat-sealing layer preferably comprises an ethylene homopolymer (high density polyethylene or low density polyethylene), a copolymer of propylene as the main component and ethylene, preferably in an amount of not more than about 10% by weight (relative to the copolymer), a copolymer of propylene as the main component and 1-butene, preferably in an amount of from about 10 to about 15% by weight (relative to the copolymer), a terpolymer of propylene, ethylene and an alpha-olefin with from 4 to 10 carbon atoms, preferably a terpolymer of from about 93.2 to about 99.0% by weight of propylene, from about 0.5 to about 1.9% by weight of ethylene and from about 0.5 to about 4.9% by weight of an alpha-olefin with from 4 to 10 carbon atoms, or a mixture of these polymers. The comonomers can be present in substantially random distribution in the polymers.

The covering layer or layers can further comprise a propylene homopolymer, in which case the melt index of the polymer employed for the covering layer should preferably be from about 0.5 to about 1.0 g/10 min. higher than the melt index of the polymer mixture employed for the base layer.

Suitable cold-sealing layers are composed of polymers based on natural or synthetic rubber.

A lubricant is added to the covering layer or layers to improve slip in view of a satisfactory machine runability and an easy filling of bags with the packaged articles. The lubricant used appropriately comprises a polydialkylsiloxane, preferably a polydialkylsiloxane which contains from 1 to 4 carbon atoms in the alkyl group, polydimethylsiloxane being particularly preferred. The polydialkylsiloxane has a kinematic viscosity of from about 1,000 to about 100,000 mm$^2$/sec at about 25° C., and preferably of from about 5,000 to about 50,000 mm$^2$/sec at about 25° C. The amount of polydialkylsiloxane employed in the covering layer or layers is from about 0.3 to about 1.5% by weight, and preferably from about 0.5 to about 1% by weight, relative to the weight of the covering layers.

The thickness of the multi-layer film according to the present invention is also from about 15 to about 30 $\mu$m, and preferably from about 20 to about 25 $\mu$m, with the thickness of the covering layer or layers being from about 0.2 to about 4 $\mu$m, and preferably from about 0.5 to about 3 $\mu$m for each particular covering layer.

In an alternate embodiment to further improve certain properties of the film according to the present invention, both the base layer and the covering layer or layers can contain appropriate additives in the particular active amount. Preferred additives include antistatic agents, stabilizers and nucleating agents. In particular, to improve processability, from about 0.1 to about 1% by weight, and preferably from about 0.2 to about 0.5% by weight, of an organic or inorganic antiblocking agent can be added to the covering layer or layers. Suitable antiblocking agents are, for example, incompatible organic polymers such as polyamide, polyester, polycarbonates and the like, or inorganic substances such as silicon dioxide and silicates, with aluminum silicate being particularly suitable.

The present invention is explained further by reference to the following nonlimiting examples.

Two examples according to the invention (Examples 1 and 2) and three reference examples (Examples 3, 4 and 5) were carried out. For the films of all examples, the twist rate was determined uniformly according to the above-indicated method. All films were twisted 1.5 times (=540°) and then released and the restoring angle was measured. The twist rate in percent indicated in each case was calculated from these data.

The machine runability was evaluated by comparing the films produced with one another.

EXAMPLE 1

A monofilm was extruded through a slot die at a temperature of approximately 280° C. The polymer mixture was composed of about 50% by weight of polypropylene and about 40% by weight of polystyrene and it additionally contained about 10% by weight of pulverulent calcium carbonate having a mean particle size of about 3.8 $\mu$m; all weight percentages given relate to the total weight of polymers plus filler material. After cooling the extruded monofilm to about 30° C. by means of a chill roll, the film was draw-oriented in the longitudinal direction with the aid of rolls driven at different speeds, at a temperature of about 125° C. and a draw ratio of about 6.0 and was thereafter transversely drawn in a draw tenter at a temperature of about 165° C. and a draw ratio of about 9.0. The biaxially draw-oriented film was then heat-set at a temperature of about 160° C. and for a period of about 5 seconds. The resulting opaque film had a density of about 0.8 g/cm$^3$ and a thickness of about 23 μm. The twist rate and the machine runability of the film are indicated in the table below.

EXAMPLE 2

With the aid of a slot die, a three-layer film was prepared according to a coextrusion process, the film comprising a base layer as indicated in Example 1, which additionally contained about 0.1% by weight of (R) Armostat 300=N,N-bisethoxy-alkyl-amine as an antistatic agent, and two covering layers of polypropylene to which about 1.0% by weight of dimethylpolysiloxane having a kinematic viscosity of about 30,000 mm$^2$/sec. had been added. Film production was carried out according to the procedure described in Example 1. The three-layer film had a total thickness of about 25 μm, each of the covering layers being about 1 μm thick. The twist rate and the machine runability of the film of Example 2 are indicated in the table below

EXAMPLE 3 (REFERENCE EXAMPLE)

According to German Offenlegungsschrift 28 14 311, a 25 μm thick polypropylene film having heat-sealable covering layers of 1 μm each on either side thereof was coextruded through a slot die at about 270° C. The polypropylene melt contained 8% by weight of finely divided calcium carbonate particles having a mean particle size of 2.4 μm. Each covering layer comprised a random copolymer of propylene and 4% by weight of ethylene. After cooling to about 30° C. on a chill roll, the film was drawn in the longitudinal direction at 125° C. (draw ratio 5.5) and then in the transverse direction at 165° C. (draw ratio 9.0). Heat setting was then carried out at 160° C.

The film had a density of 0.75 g/cm$^3$. The twist rate and the machine runability are indicated in the table below.

EXAMPLE 4 (REFERENCE EXAMPLE)

A polypropylene film which had heat-sealable covering layers on both sides thereof was coextruded through a slot die at about 270° C. The melt used for the film forming the base layer was composed of 80% by weight of a propylene homopolymer and 20% by weight of a pulverulent calcium carbonate having a mean particle size of 3.8 μm. The melt of the polymer forming the covering layers comprised a random copolymer of propylene and 4% by weight of ethylene. After cooling the coextruded film to about 30° C. on a chill roll, the film was drawn in the longitudinal direction at 125° C. (draw ratio 6.0) and then in the transverse direction at 165° C. (draw ratio 9.0). Heat setting was then carried out for 5 seconds at 160° C.

The opaque polypropylene multi-layer film thus obtained had a density of 0.46 g/cm$^3$ and a thickness of 25 μm, each heat-sealing layer having a thickness of 1 μm. The twist rate and the machine runability are indicated in the table below.

EXAMPLE 5 (REFERENCE EXAMPLE)

By extruding and then draw orienting and heat setting corresponding to the preceding examples, a monofilm was prepared comprising a mixture of 75% by weight of a propylene homopolymer and 25% by weight of a low-molecular weight hydrocarbon resin having a softening point in the range of from 80° to 120° C. The hydrocarbon resin of this example was the resin which is sold under the designation of (R) "Arkon P 125" by Messrs. Arakawa, Japan. The monofilm had a thickness of 25 μm. For twist rate and machine runability see the following table.

TABLE

| | Examples and Reference Examples | twist rate % | machine runability during twisting and filling of bags |
|---|---|---|---|
| Example 1 | monofilm composed of 50% of PP 40% of PS 10% of CaCO$_3$ | 91 | + − |
| Example 2 | three-layer film "ABA" base layer as in Ex. 1 + 0.1% of (R) Armostat 300; covering layers PP + 1.0% of DMPS | 88 | + + |
| Example 3 (Reference) | three-layer film "ABA" base layer PP + 8% of CaCO$_3$; covering layers C$_2$–C$_3$ copolymer with 4% proportion of C$_2$ | 25 | − − |
| Example 4 (Reference) | three-layer film "ABA" base layer PP + 20% of CaCO$_3$; covering layers as in Ex. 3 | 59 | − |
| Example 5 (Reference) | monofilm 75% of PP + 25% of hydrocarbon resin | 72 | + − |

+ + = excellent
+ = good
+ − = satisfactory
− = poor
− − = unsuitable for use on machine
PP = polypropylene
PS = polystyrene
DMPS = dimethylpolysiloxane

What is claimed is:

1. An opaque, biaxially draw-oriented thermoplastic film comprising a polymer mixture comprising:
   (a) from about 40 to about 60% by weight of polypropylene;
   (b) from about 35 to about 55% by weight of polystyrene; and
   (c) from about 5 to about 15% by weight of a filler material, said amounts being relative to the total weight of said polymer mixture
   wherein the twist rate of said film comprises a value of at least 85%, as measured at a total rate of winding in a range of from about 360° to 900°.

2. A film as claimed in claim 1, wherein said filler material comprises an inorganic filler comprising calcium carbonate, silicon dioxide, titanium dioxide or mixtures thereof, each said filler material having a mean particle size in a range of from about 2 to about 5 μm.

3. A film as claimed in claim 1, wherein the density of said film is a value lower than the additive value of the density of each individual component of said film.

4. A film as claimed in claim 1, wherein said film comprises a multi-layer structure having a base layer comprising said polymer mixture, and at least one functional covering layer on at least one side of said base layer.

5. A film as claimed in claim 4, wherein the thickness of said base layer comprises more than 50% of the total thickness of said multi-layer structure.

6. A film as claimed in claim 4, wherein the thickness of said at least one covering layer comprises a value within a range of from about 0.5 to about 5 μm.

7. A film as claimed in claim 6, wherein said thickness comprises a value within a range of from about 0.5 to about 2 μm.

8. A film as claimed in claim 4, wherein said at least one covering layer comprises a lubricant comprising from about 0.4 to about 1.5% by weight of polydialkylsiloxane, relative to the weight of said at least one covering layer.

9. A film as claimed in claim 1, wherein the total thickness of said film comprises a value within a range of from about 15 to about 30 μm.

10. A film as claimed in claim 9, wherein said thickness comprises a value within a range of from about 20 to about 25 μm.

11. A film as claimed in claim 1, wherein said film comprises a single-layer film.

12. A film as claimed in claim 1, wherein said polypropylene comprises a polymer having a melting point within a range of from about 150° to about 170°C.

13. A film as claimed in claim 1, wherein said polymer mixture has a melt flow index in a range of from about 0.5 g/10 min. to about 8 g/10 min. measured at a temperature of about 230° C. and 2.16 g load measured at DIN 53,735.

14. A film as claimed in claim 13, wherein said range is from about 1.5 g/10 min. to about 4 g/10 min.

15. A film as claimed in claim 1, wherein said filler material comprises an organic filler.

16. A film as claimed in claim 1, further comprising an antioxidant, antistatic agent, colorant, stabilizer or mixtures thereof.

17. A film as claimed in claim 6, wherein said at least one covering layer comprises a heat-sealable layer.

18. A film as claimed in claim 17 wherein said heat-sealing layer comprises an ethylene homopolymer, a copolymer of propylene and ethylene in an amount of not more than about 10% by weight relative to the copolymer, a copolymer of propylene and 1-butene in an amount of from about 10 to about 15% by weight relative to the copolymer, a terpolymer of propylene, ethylene and an alpha-olefin having from 4 to 10 carbon atoms, or a mixture thereof.

19. A film as claimed in claim 4, wherein at least one of said base layer and said covering layer comprise from about 0.1 to about 1% by weight of an antiblocking agent.

20. An article of manufacture, comprising an article twist-wrapped with an opaque, biaxially draw-oriented thermoplastic film comprising a polymer mixture comprising:
   (a) from about 40 to about 60% by weight of polypropylene;
   (b) from about 35 to about 55% by weight of polystyrene; and
   (c) from about 5 to about 15% by weight of a filler material, said amounts being relative to the total weight of said polymer mixture.

21. An opaque, biaxially draw-oriented thermoplastic film comprising a polymer mixture, consisting essentially of:
   (a) from about 40 to about 60% by weight of polypropylene;
   (b) from about 35 to about 55% by weight of polystyrene; and
   (c) from about 5 to about 15% by weight of a filler material, said amounts being relative to the total weight of said polymer mixture where the twist rate of said film comprises a value of at least 85%, as measured at a total rate of winding in a range of from about 360° to 900°.

22. A twist wrapper for small articles, consisting essentially of an opaque, biaxially draw-oriented thermoplastic film comprising a polymer mixture comprising:
   (a) from about 40 to about 60% by weight of polypropylene:
   (b) from about 35 to about 55% by weight of polystyrene; and
   (c) from about 5 to about 15% by weight of a filler material, said amounts being relative to the total weight of said polymer mixture.

* * * * *